(12) United States Patent
Caswell

(10) Patent No.: US 11,568,345 B1
(45) Date of Patent: Jan. 31, 2023

(54) COGNITIVE-DEFINED NETWORK MANAGEMENT

(71) Applicant: DISH Wireless L.L.C., Englewood, CO (US)

(72) Inventor: Justin Wayne Caswell, Centennial, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 17/407,602

(22) Filed: Aug. 20, 2021

(51) Int. Cl.
*G06Q 10/06* (2012.01)
*G06F 17/15* (2006.01)

(52) U.S. Cl.
CPC ....... *G06Q 10/0633* (2013.01); *G06F 17/153* (2013.01)

(58) Field of Classification Search
CPC ............ G06Q 10/00–50/00; G06F 1/00–40/00
USPC ................................................ 705/7.11–7.42
See application file for complete search history.

(56) References Cited

U.S. PATENT DOCUMENTS

| | | | | |
|---|---|---|---|---|
| 7,843,822 B1* | 11/2010 | Paul | ..................... | H04L 41/0816 370/254 |
| 8,494,989 B1* | 7/2013 | VanDerHorn | ......... | H04W 24/02 706/13 |
| 8,514,802 B2* | 8/2013 | Junell | .................... | H04W 28/16 370/252 |
| 8,571,467 B2* | 10/2013 | Uusitalo | ............. | G06F 16/9574 455/454 |
| 8,839,347 B2* | 9/2014 | Boldyrev | ............... | H04W 12/02 455/454 |
| 10,979,932 B2* | 4/2021 | Imran | ..................... | H04W 76/11 |
| 11,349,725 B2* | 5/2022 | Mwanje | ................ | H04W 24/02 |
| 2011/0138183 A1* | 6/2011 | Reddy | ................... | H04W 12/08 713/168 |
| 2015/0043386 A1* | 2/2015 | Racz | ................... | H04L 41/0886 370/255 |
| 2016/0205697 A1* | 7/2016 | Tan | ........................ | H04W 24/02 370/329 |
| 2019/0273662 A1* | 9/2019 | Mwanje | ................ | H04L 41/145 |
| 2021/0035014 A1* | 2/2021 | Dey | ...................... | G06K 9/6262 |
| 2021/0192314 A1* | 6/2021 | Aarts | ................... | G06N 3/0445 |
| 2022/0021587 A1* | 1/2022 | Schultz | ................. | H04W 24/02 |

\* cited by examiner

*Primary Examiner* — Alan S Miller
(74) *Attorney, Agent, or Firm* — Kilpatrick Townsend & Stockton LLP

(57) ABSTRACT

Techniques are described for cognitive defined network management (CDNM) that seek to perform real-time collection and analysis of raw network data from across a disaggregated wireless network and to dynamically orchestrate network management functions substantially in real time, accordingly. For example, a multi-modal artificial intelligence (AI) engine is trained to normalize the heterogeneous raw network data into homogeneous so-called "golden record data." A repository of historical golden records can be maintained for generating data models for use in training AI network management applications. An orchestrator can operate to directing execution of pre-developed network management workflows based on results obtained from querying the trained AI network management applications with newly received (real-time) golden records.

20 Claims, 5 Drawing Sheets

COGNITIVE-DEFINED NETWORK MANAGEMENT

FIELD OF THE INVENTION

Embodiments generally relate to wireless communication network infrastructures, and, more particularly, to automated dynamic management and control of network functions using cognitive-defined network management.

BACKGROUND OF THE INVENTION

The architecture of a wireless communication network can be highly complex. For example, modern wireless communication networks can include both aggregated and disaggregated portions of the infrastructure with very large numbers of communication nodes and dynamically changing characteristics. Additional network complexities arise from various characteristics of modern wireless communication networks being highly dynamic with constant and rapid changes in network resource availability, network resource demands, environmental factors, etc. Some modern wireless communication networks (e.g., those built around "fifth generation" (5G) standards promulgated by standards setting organizations under the umbrella of the Third Generation Partnership Project (3GPP)) are architected with many large numbers and types of ingress and egress points (e.g., nodes), network slices, etc.; each having a defined set of network characteristics that perform certain network functions and/or can be tailored or optimized for particular uses. For example, one slice can be optimized for internet-of-things (IoT) communications, while another slice is optimized for cellular communications, etc.

As the overall network characteristics are highly dynamic, it can be desirable to dynamically orchestrate network functional characteristics to respond accordingly. Typically, human administrators analyze the performance of the various portions of the network to determine when and how to orchestrate various complex functions in the network. However, such administration tends to involve different groups of people, each collecting and analyzing massive amounts of diverse types of information from a respective portion of the network, and trying to keep up with changes by constant manual updates. This conventional approach tends to be slow, inconsistent, error-prone, and myopic; and tends to be too slow, and/or otherwise insufficient, to respond to dynamic current (or even anticipated) changes in network characteristics.

Further, modern communication networks are evolving toward disaggregation and virtualization of network functions, such as by implementing cloud-native architectures and network components. Some modern wireless networks are even beginning to disaggregate the radio access network (RAN) itself, such as through development of the so-called "Open RAN," or "O-RAN." While virtualization and disaggregation can yield various efficiencies and other features for the network, it can also create certain complexities. For example, in a disaggregated, cloud-native architecture, the large numbers and types of network functions can be provided by different vendors and/or operated by different network operators. Even using standards to enforce a certain amount of interoperability, different vendors and/or operators can tend to rely on, and generate different data, in different formats, at different times, etc. For these and other reasons, conventional approaches to network management tend to be unable to dynamically orchestrate complex aspects of the network, including dynamic control of network functions.

SUMMARY OF THE INVENTION

Embodiments described herein provide techniques for cognitive defined network management (CDNM) that seek to perform real-time collection and analysis of raw network data from across a disaggregated wireless network and to dynamically orchestrate network management functions substantially in real time, accordingly. For example, a multi-modal artificial intelligence (AI) engine is trained to normalize the heterogeneous raw network data into homogeneous so-called "golden record data." A repository of historical golden records can be maintained for generating data models for use in training AI network management applications. An orchestrator can operate to directing execution of pre-developed network management workflows based on results obtained from querying the trained AI network management applications with newly received (real-time) golden records.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION OF THE INVENTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
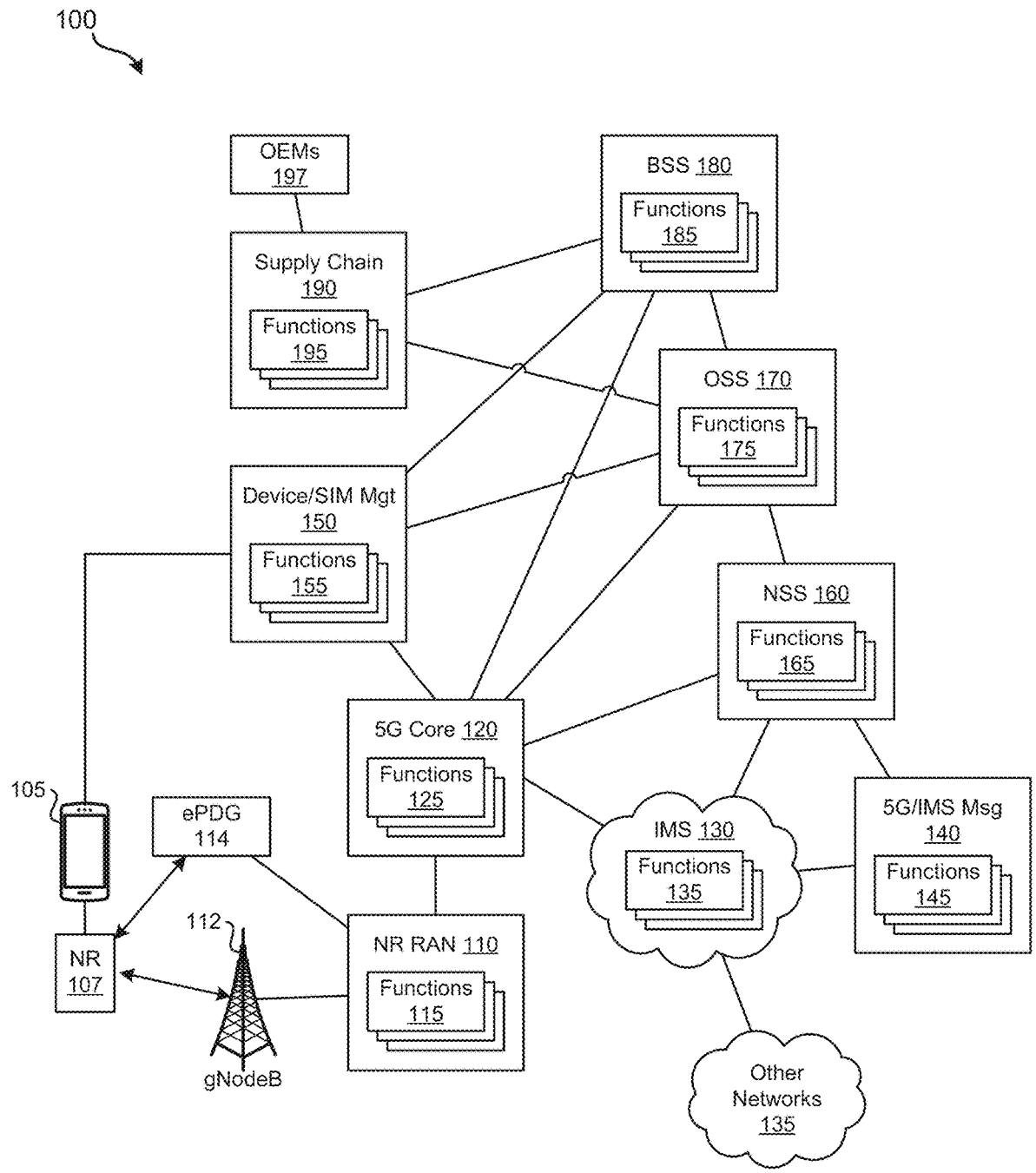
FIG. 1 shows an example of a conventional wireless communication network architecture, as context for various embodiments described herein.

FIG. 1 shows an example of a conventional wireless communication network architecture 100, as context for various embodiments described herein. The conventional wireless communication network architecture 100 can represent a portion of a modern, wireless network that may be invoked in a network transaction, such as a voice call. As illustrated, the architecture 100 is complex with a very large number of diverse types of network functions. Many of the network functions can be virtualized, such as by implementing them in a cloud-native architecture. Further, some or all portions of the architecture 100 can be disaggregated, such that network functions are developed, deployed, and/or operated by multiple vendors and/or operators. In such an architecture 100, many network functions have dynamically changing characteristics, and overall network characteristics (e.g., state) can be highly dynamic with constant and rapid changes in network resource availability, network resource demands, environmental factors, etc.

The illustrated conventional network architecture 100 can represent a portion of a modern, wireless network built around "fifth generation" (5G) standards promulgated by standards setting organizations under the umbrella of the Third Generation Partnership Project (3GPP). For example, the illustrated portion of the architecture 100 may be some of those network function invoked in a standard network transaction, such as a voice call. For the sake of illustration, a user equipment (UE) device 105, such as a smartphone, is shown as deploying a so-called "new radio" (NR) 107 designed to communicate with a NR radio access network (RAN) 110 of the 5G network. The NR 107 can communicate with the NR RAN 110 in various ways, such as via an evolved packet data gateway (ePDG) 114, a so-called "gNodeB" or "gNb" 117 (a 3GPP 5G next-generation base station to supports the 5G NR 107), or other radio unit (RU).

The NR RAN 110 (or "Next Generation RAN") can enclose a future-proof software offering that co-exists with deployed long-term evolution (LTE) networks and smoothly prepares the migration from LTE to NR. Some evolved networks are beginning to deploy the NR RAN 110 as a disaggregated RAN (referred to as an "Open RAN," or "O-RAN") which can include hierarchy (e.g., tree structure) of RAN functions 115. For example, each of multiple centralized units (CUs) is coupled with multiple distributed units (DU), and each DU is coupled with multiple RUs. As such, each NR 107 can communicate with a backhaul network infrastructure (e.g., the 5G Core 120) according to an assigned communication path through a particular RU, DU, and CU. The NR RAN 110 can include additional RAN functions 115, such as a real-time RAN intelligent controller (RIC), a non-real-time RIC, etc.

The 5G Core 120 can include a number of core functions 125, such as a Home Subscriber Server (HSS), which can be a main database of a current generation cellular communications system; an Equipment Identity Register (EIR) function; a policy control function (PCF), which can apply session policies for the UE 105, or other devices when connecting over 4G or 5G; a Unified Data Management (UDM) function, which can manage network user data in a single, centralized element, and can be similar to the HSS in a cloud-native implementation designed specifically for 5G; a User Plane Function (UPF), which can perform user plane operations, like maintaining protocol data unit (PDU) sessions, packet routing and forwarding, packet inspection, policy enforcement for the user plane, quality of service (QoS) handling, etc.; a Network Repository Function (NRF); a Network Exposure Function (NEF), which can expose services and resources over application programming interfaces (APIs) within and outside the 5G Core 120), a Network Slice Selection Function (NSSF), which can provide tailor made logical networks on the physical network; an Authentication Server Function (AUSF); a Location Management Function (LMF); a Gateway Mobile Location Center (GMLC) function; an Access and Mobility Management Function (AMMF), which can perform operations like mobility management, registration management, connection management, UE-based authentication, etc.; a Session Management Function (SMF), which can perform internet protocol (IP) address allocation and management for UEs 105, user plane selection, and packet routing in conjunction with the UPF; etc.

Behind the 5G core 120, the network architecture 100 can include many different types of functional subsystems, such as an IP Multimedia Subsystem (IMS) 130, a 5G-IMS Messaging Subsystem 140, a Device and Subscriber Identification Module (SIM) ("Device/SIM") Management Subsystem 150, a Network Service Systems (NSS) Subsystem 160, an Operation Support Systems (OSS) Subsystem 170, a Business Support Systems (BSS) Subsystem 180, a Supply Chain Subsystem 190, etc. The IMS can include various IMS functions 135, such as a Proxy Call Session Control Function (P-CSCF), which can behave as a session initiation protocol (SIP) proxy by forwarding SIP messages between the UE 105 and the 5G Core 120; an Interrogating Call Session Control Function (I-CSCF), which can interrogate the HSS to determine to which suitable Call Session Control Function (CSCF) to route the request for registration; a Serving Call Session Control Function (S-CSCF), which can provide session set-up, provide session tear-down, provide session control and routing functions, generate records for billing purposes for all sessions under its control, etc.; an Emergency Call Routing (ECR) function; a Breakout Gateway Control Function (BGCF), which can be responsible for determining the next hop for routing of SIP messages; a Media Gateway Control Function (MGCF), which can be used to interact with a public switched telephone network (PSTN); an IMS Media Gateway (IMS-MGW), which can handle voice functions, such as by making protocol translations to support a voice call; a Session Border Control (SBC) function; an Interconnect Border Control Function (IBCF), which can be an SBC specialized for network-to-network interfaces (NNIs), offers boundary control between various service provider networks, and provides IMS network security in terms of signaling information; a Media Resource Function (MRF); etc. The 5G/IMS Messaging Subsystem 140 can include various messaging functions 145, such as a Short Message Service Center (SMSC) function, a Multimedia Message Service Center (MMSC) function, a Voicemail function, a Visual Voicemail (VVM) function, a Rich Communications Services Application Server (RCS AS) function, etc. The Device/SIM Management Subsystem 150 can include various Device/SIM Management functions 155, such as an Automatic Device Detection (ADD) function, an Entitlement Server, etc. The NSS Subsystem 160 can include various NSS functions 165, such as a Network Assurance function, a Network Inventory function, a Provisioning and Activation function, Network Slice Composition functions (e.g., including a Network Service Orchestration function, a Network Slice Subnet Management Function (NSSMF), etc.), etc. The OSS Subsystem 170 can include various OSS functions 175, such as a Coverage Management function, a Service Assurance function, a Local Service Management System (LSMS) function (which can be a database with latest location routing number (LRN) information used by local number portability (LNP) for routing), etc. The BSS Subsystem 180 can include various BSS functions 185, such as a Wholesale Platform function, a customer resource management (CRM) function, a billing function, a mediation function, a "Configure, Price, Quote" (CPQ) function, etc. The Supply Chain Subsystem 190 can include a number of supply chain functions 195, such as an Inventory System function, a Forecasting function, a Warehouse Management function, an Asset Tracking function, a Workforce Management function, etc. In addition to the subsystems and functions considered to be part of the network architecture 100, there can be a large number of interfaces between the network architecture 100 and external functions. For example, the LSMS function in the OSS Subsystem 170 can interface with one or more Number Portability Administration Centers (NPACs), the IMS Subsystem 130 can support NNIs with multiple external networks 135 (e.g., PSTNs, other IMS networks, voice over IP (VoIP) networks, peering networks, etc.), the GMLC function of the 5G Core 120 can interface with one or more external clients, the Supply Chain subsystem 190 can interface with one or more original equipment manufacturers (OEMs) 197, etc.

Each of the vary large number and diversity of functions of the network architecture 100 can be considered as an ingress and/or egress point (IEP). Any particular IEP typically operates to output certain network data in a certain data format based on receiving certain network data in a certain data format. In some cases, network data of any particular IEP can be relatively static, such as long-term subscription data relating to a particular subscriber. In other cases, network data of any particular IEP can be highly dynamic, such as network state information for a particular RU in the NR RAN 110. For example, such highly dynamic network data can update at sub-millisecond, or even microsecond speeds. Thus, over the entire network architecture 100, large numbers and varieties of IEPs tend to constantly request and produce large amounts and varieties of data, resulting in highly dynamic characteristics across the network.

In addition to network functions provided at the IEP level, network operators typically seek to orchestrate higher level functions in the network in a manner that is responsive to the dynamic characteristics of the network. For example, subscribers on a communication network use various types of devices (e.g., UEs 105) and applications that provide continuous feedback loops of data to network monitoring services. Network operators may desire, or even be obligated to monitor service level connection characteristics (e.g., requirements, state, etc.) to meet contractual terms, statutory guidelines, standard protocols, etc. Such monitoring can enable network operators to provide certain levels of quality of service (QoS), device and/or application support, safety services, and/or many other features. Some examples of higher level functions to support such features include creating or destroying network slices in 5G network architectures 100 in accordance with changing supply of, and/or demand for bandwidth and/or other network resources. Making an accurate determination as to whether it is beneficial at any given moment to create or destroy a network slice can involve receiving and analyzing many different amounts and types of data from across multiple IEPs, and providing appropriate direction to those and/or other IEPs to carry out the higher level function of slice creation or destruction.

Conventionally, attempts to orchestrate higher level network functions tend to be unable to accurately and rapidly respond to dynamic changes in network characteristics. Typically, human administrators analyze the performance of the various portions of the network to determine when and how to orchestrate various complex functions in the network. However, such administration tends to involve different groups of people, each collecting and analyzing massive amounts of diverse types of information only from a respective portion of the network, and trying to keep up with changes by constant manual updates. This conventional approach tends to be slow, inconsistent, error-prone, and myopic; and tends to be insufficient to respond to dynamic current (or even anticipated) changes in network characteristics.

Embodiments described herein provide techniques for cognitive defined network management (CDNM) that seeks to perform real-time collection and analysis of raw network data from across a disaggregated wireless network and to dynamically orchestrate network management functions substantially in real time, accordingly. For example, a multi-modal artificial intelligence (AI) engine is trained to normalize the heterogeneous raw network data into more homogeneous so-called "golden record data" that is suitable for aggregation, cross-network creation of model data sets, etc. A repository of historical golden records can be maintained for generating data models for use in training AI network management applications. An orchestrator can operate to directing execution of pre-developed network management workflows based on results obtained from querying the trained AI network management applications with newly received (real-time) golden records.

Figure 2:
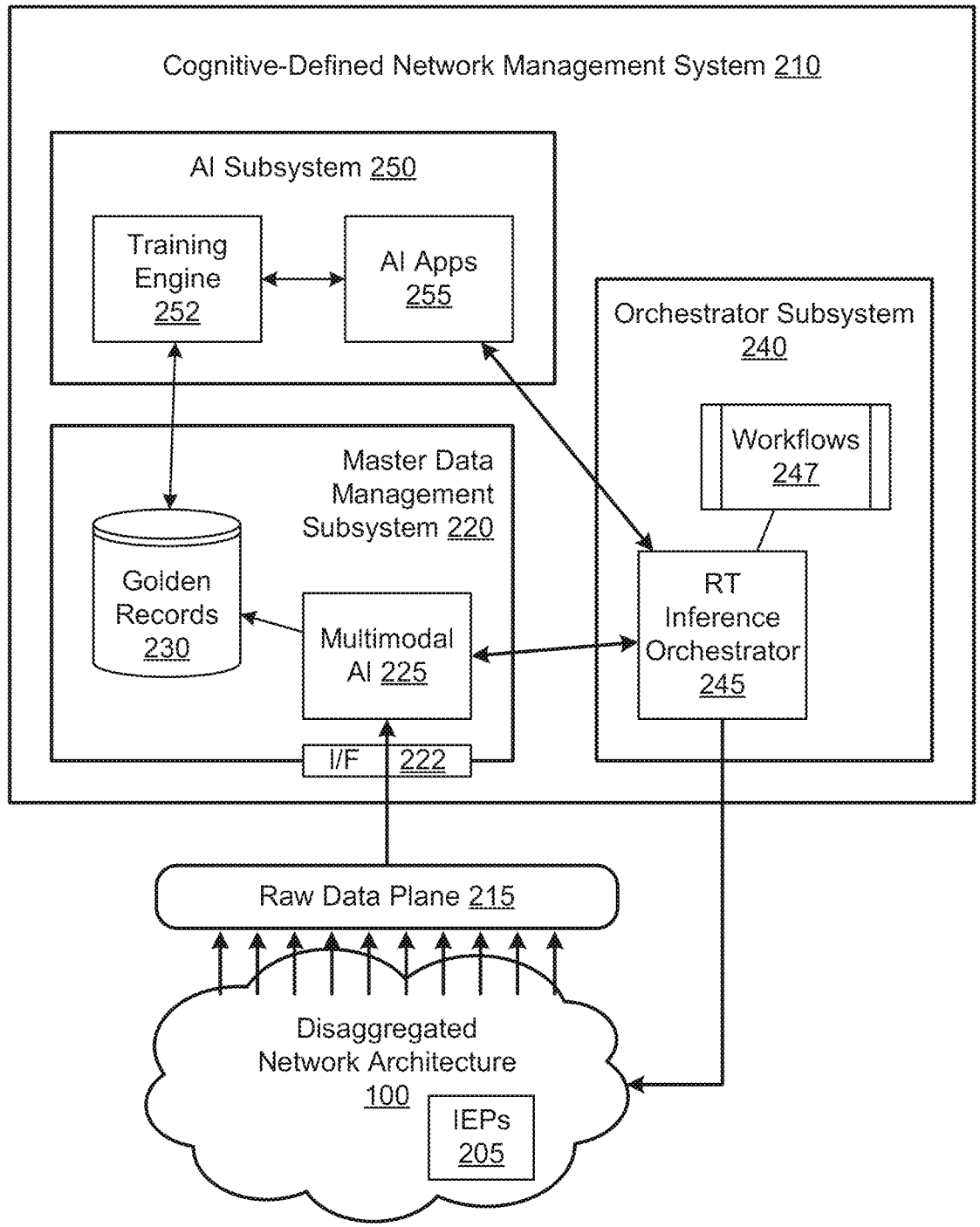
FIG. 2 shows a partial communication network architecture having a cognitive-defined network management (CDNM) system 10, according to embodiments described herein.

FIG. 2 shows a partial communication network architecture 200 having a cognitive-defined network management (CDNM) system 210, according to embodiments described herein. As illustrated, the communication network architecture 200 includes a general disaggregated network architecture 100 in communication with the CDNM system 210 via a raw data plane 215. The disaggregated network architecture 100 can be implemented as (or to include) the architecture 100 described with reference to FIG. 1. The disaggregated network architecture 100 generally includes a large number of different types of ingress/egress points (IEPs) 205. As used herein, IEPs 205 generally represent any node that receives and/or outputs raw network data. Any network functions described with reference to FIG. 1, and any other component of the network involved with total system monitoring can be considered as IEPs 205. For example, any applications, RUs, DUs, CUs, RICs, physical hardline infrastructure points, physical hardware, virtualization nodes, cloud native functions, network switches, routers, servers, fiber interconnects, top-of-rack components, detection and/or measurement nodes (e.g., for monitoring electromagnetic spectrum metrics), etc. can be IEPs 205.

Some or all IEPs 205 feed data to a raw data plane 215. The raw data plane 215 collects raw network data from the IEPs 205 prior to the data being changed, manipulated, assigned for processing for usage, etc. Embodiments of the raw network data in the raw data plane 215 can include any network data that is not part of a "higher level plane," such as the user plane (data plane), control plane, management plane, forwarding plane, or operational plane. Rather, the raw data plane 215 includes raw network data directly from IEPs 205 throughout the network (e.g., in totality). In some cases, raw network data can include data originating from an IEP 205 associated with a higher level plane (e.g., the user plane, etc.), but prior to being assigned to the higher level plane.

In some embodiments, the raw data plane 215, when observed in totality as a live operational function, can have theoretically infinite and dynamic scalability that can persistently evolve to reflect both the real world and virtual environments of the entire network on all planes simultaneously. Such a function is referred to as the "breathing of the network." The raw data plane 215, combined with the breathing of the network function, can create a new cognitive plane in computer networking that can be leveraged by networks in novel ways. In the case of wireless networks, such a cognitive plane can be leveraged by applying artificial intelligence technologies and methodologies to perform certain tasks that would otherwise be impractical or too complex for all conventional capabilities. As an example, referring to the architecture of FIG. 1, the task to create and/or destroy network slices on wireless networks involves orchestration between the OSS subsystem 170, the BSS subsystem 180, the NSS Subsystem 160, third party systems, internal & external API's, hybrid cloud functions, multi-domain functions, multi-tenant functions, virtualization functions, and other systems and services. Additionally services and systems can evolve, new ones can be implemented, old ones can be deprecated and removed, and extensions of the core network can be implemented as the entire wireless network expands and contracts over time. The amount of raw network data from all of these services and systems is too vast and complex for modern wireless architectures to operate efficiently and autonomously using conventional approaches.

Though shown as a disaggregated network architecture 100, the total system architecture can include both closed and open approaches. For example, some functions involve complex orchestration with additional considerations given to closed legacy approaches that will be evolving to open approaches. As noted above, some modern wireless networks are working toward O-RAN approaches with completely disaggregated, cloud-native architectures. The disaggregated approach can provide a more easily adaptable architecture that can evolve with more fluidity over time. However, such disaggregation also presents various challenges, given that the architecture allows for a wide range and vast diversity of services and systems to cohabitate in a cloud-native ecosystem that all have to be coordinated, integrated, and orchestrated with telecommunication grade requirements. For example, such an ecosystem can include vast amounts of data, functions, planes, domains, systems, services, etc.

The raw network data representing this ecosystem (e.g., as used and generated by its component parts) is collected in the raw data plane 215. For example, the raw data plane 215 can include one or more data lakes, data ponds, and/or any other suitable storage for generally un-structured big data in one or more raw data formats. Data from the raw data plane 215 is used by the CDNM system 210 to dynamically perform automated network management workflows 247. Embodiments of such automated network management workflows 247 can be used to implement intelligent, automated, self-learning, and self-evolving orchestration capabilities to meet open disaggregated cloud native architectures. For example, automated network management workflows 247 can be used to implement dynamic wireless network slice orchestration for 5G networks. As illustrated, the CDNM system 210 includes a master data management subsystem 220, an orchestrator subsystem 240, and an artificial intelligence (AI) subsystem 250.

The master data management subsystem 220 includes a raw data plane interface 222 to receive raw real-time network data 217 from across the IEPs 205 of the disaggregated communication network architecture 100 via the raw data plane 215. The master data management subsystem 220 also includes a multimodal AI engine 225 trained to convert the raw real-time network data 217, as it is received, into real-time golden record data 227. The master data management subsystem 220 also includes a golden records database 230 to store at least some of the real-time golden record data 227 as historic golden record data 232. The multimodal AI engine 225 can apply various types of processing to the raw real-time network data 217 to generate the real-time golden record data 227 based on training the multimodal AI engine 225 for different data sources, data types, data formats, vendors, etc. In general, such processing is referred to herein as "normalizing" the data.

One aspect of normalizing the raw real-time network data 217 is to convert diverse datasets into data that can easily be aggregated, combined, and/or otherwise used together. This can involve performing tasks, such as identifying common IEP 205 types (e.g., by type of device, type of virtualized instance, vendor, role in the network, etc.) and/or common data types (e.g., expressing a common or sufficiently related measurement, falling into a particular data category, etc.). While the normalizing is associated with the multimodal AI engine 225, some of these tasks may not rely on AI algorithms to obtain useful results. For example, some implementations can identify commonalities using databases, lookup tables, filtering, keyword searching, metadata analysis, deep packet inspection, etc. Such non-AI processing can be performed by the multimodal AI engine 225, or another component of the master data management subsystem 220 (e.g., a separate processing component, not shown).

Additionally or alternatively, some or all of these tasks may rely on AI algorithms to effectively and/or efficiently arrive at a useful result, and those tasks are performed using the multimodal AI engine 225. As used herein, the term "AI" is intended to broadly include any suitable AI, machine learning (ML), deep learning, and related techniques and algorithms. For example, the AI algorithms can include algorithms based on linear regression, logistic regression, linear discriminant analysis, decision trees, naive bayes, k-nearest neighbors, learning vector quantization, support vector machines, bagging and random forest, deep neural networks, and/or any other suitable algorithms. In general, such AI algorithms are trained to generate particular outputs from particular inputs by "learning" a function that provides precise correlation between those particular inputs and outputs.

As an example, each router in the disaggregated network architecture 100 outputs a raw data feed. Though all of those feeds represent raw data output from a network router, the specific structure, format, and/or other characteristics of the raw data feeds will vary, depending on the type of router (e.g., make, model, firmware, etc.), its role in the network, the specific data being transmitted and/or requested via the router, etc. The multimodal AI engine 225 include AI algorithms trained to take the raw data feeds from the variety of routers and to output normalized router data feeds, such that all the data from all the routers is in a format that can be used together as a consistent dataset.

Another aspect of normalizing the raw real-time network data 217 is to ensure that data records are accurate and updated. As an example, various data about a particular subscriber can be stored by many different IEPs 205 for many different reasons. As the data changes over time, certain IEPs 205 can have inconsistent, incorrect, and/or outdated information about the subscriber. For example, suppose a subscriber moves a SIM card to a new UE 105 that has a different associated NR 107, different installed apps, different capabilities, etc. Certain device/SIM management functions 155 at different times than certain 5G core functions 125. Embodiments of the multimodal AI engine 225 include AI algorithms trained to generate the real-time golden record data 227 based on identifying accurate and updated versions of data records.

The golden records generated by the multimodal AI engine 225 are leveraged by other components of the CDNM system 210 along two distinct paths. Along one path, the historic golden record data 232 in the golden records database 230 is used to train AI algorithms to be able to make automated decisions about the network based on certain types of inputs. Along another path, the real-time golden record data 227 is fed into already-trained AI algorithms to make automated real-time inference decisions about the network. As such, the CDNM system 210 can leverage data from across the raw data plane 215 (i.e., from across the disaggregated network architecture 100) to train automated decision-making entities (i.e., in the AI subsystem 250) and to use those trained automated decision-making entities to inform automated real-time orchestration of network workflows (i.e., in the orchestrator subsystem 240).

Embodiments of the AI subsystem 250 include a training engine 252 and a number of AI applications 255. Each of the AI applications 255 is designed to provide one or more network management query results to support one or more types of the automated network management workflows 247 in accordance with one or more trained AI algorithms. The AI algorithms can include the same or different AI algorithms used by the multimodal AI engine 225. The training engine 252 is configured to train the AI applications 255 so that the AI applications 255 can learn their respective functions at least until they are ready to be used for executing automated network management workflows 247. The training engine 252 can assemble large representative training datasets from the historic golden record data 232 stored in the golden records database 230. For example, each AI application 255 can be designed along with a particular training model that indicates the types of training data to be used for training the AI application 255. The training engine 252 interfaces with the golden records database 230 to populate the training models with appropriate sets of historic golden record data 232. Because the historic golden record data 232 has been normalized by the multimodal AI engine 225, even historic golden record data 232 being received from across the disaggregated network architecture 100 (e.g., from different vendors, in different formats, etc.) can be aggregated for use by the training engine 252 to populate the training models. The training model datasets can be fed into the AI algorithms of the various AI applications 255 to test functional correlations with desired outputs, and results can be fed back to the AI algorithms to iteratively tune the function and hopefully to improve the functional correlations between the desired outputs and training model inputs. Ultimately, a particular AI application 255 is considered to be trained, such that the correlation between the inputs and outputs for the underlying functions are above a predetermined level of accuracy. For example, a particular AI application 255 is designed to be considered "trained" only after it has achieved a 99.99-percent correlation accuracy (or any other predetermined accuracy level).

It can be assumed that at least some of the AI applications 255 are fully trained. For example, some portion of the AI applications 255 is fully trained, and some other portion of the AI applications 255 is still presently in training. Notably, while in training, the training engine 252 generates the model training datasets from historic golden record data 232. Once fully trained, the orchestrator subsystem 240 can leverage the AI applications 255 to provide real-time network management query results from real-time golden record data 227.

Embodiments of the orchestrator subsystem 240 are coupled with the maser data management subsystem 220 and the AI application subsystem 250, and include a real-time inference orchestrator 245. The real-time inference orchestrator 245 has the automated network management workflows 247 stored thereon, and/or in a storage location accessible to the real-time inference orchestrator 245. Each automated network management workflow 247 is designed to orchestrate, and/or to determine whether to orchestrate a particular higher-level network management function (i.e., invoking multiple IEPs 205 across the disaggregated network architecture 100) in response to a defined one or more trigger conditions. The one or more trigger conditions can be based on a set of real-time golden record data 227 that indicates a particular network condition, state, etc.; and the automated network management workflow 247 is designed to dynamically adjust network functionality to address the particular network condition, state, etc. Determining whether and/or how to dynamically adjust the network functionality is based on feeding a portion of the real-time golden record data 227 to one or more of the AI applications 255 that is associated with a triggered automated network management workflow 247, and on automatically obtaining one or more of the network management query results from the AI applications 255, accordingly. The real-time inference orchestrator 245 can then direct execution of the automated network management workflows 247 at least by instructing operation of multiple IEPs 205 as defined by the defined automated network management workflows 247 based on the one or more of the network management query results.

Figure 3:
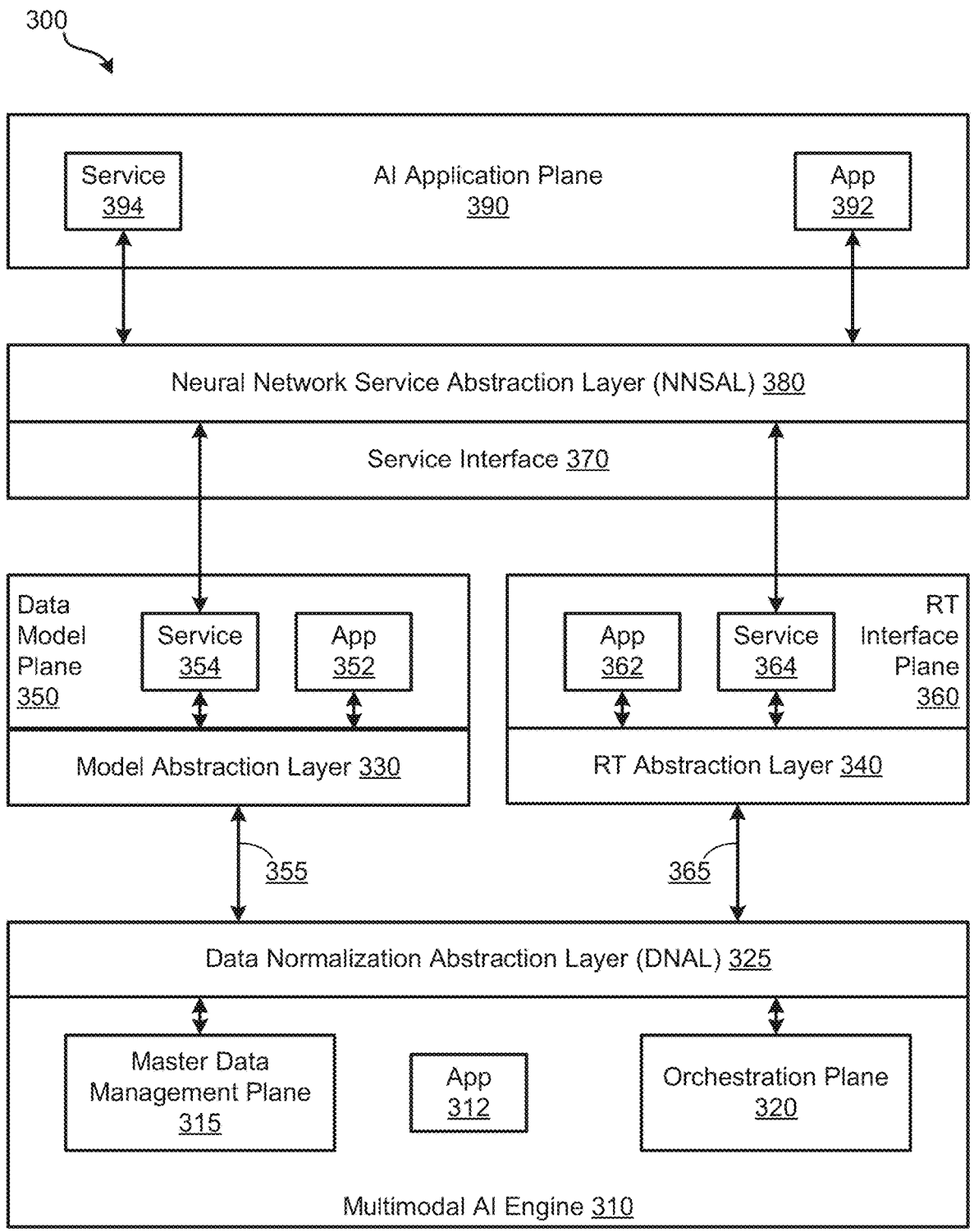
FIG. 3 shows an illustrative implementation of a CDNM system, according to various embodiments described herein.

FIG. 3 shows an illustrative implementation of a CDNM system 300, according to various embodiments described herein. The CDNM system 300 can be an implementation of the CDNM system 210 of FIG. 2. As illustrated, the CDNM system 300 includes a multimodal AI engine 225, a master data management plane 315, an orchestration plane 320, a data model plane 350, a real-time inference plane 360, a service interface 370, and an AI application plane 390. Some or all of the planes can have associated abstraction layers. In general, each abstraction layer is designed to abstract certain details of its associated layer to facilitate interoperability (e.g., including protocol compliance and/or independence, platform independence, etc.) with layers above and/or below. In the illustrated implementation, the master data management plane 315 and orchestration plane 320 effectively share a data normalization abstraction layer (DNAL) 325, the data model plane 350 has a model abstraction layer 330, the real-time inference plane 360 has a real-time abstraction layer 340, and the service interface 370 has a neural network service abstraction layer (NNSAL) 380.

For added clarity, the CDNM system 300 is shown according to a multi-level convention to illustrate the particular architectural implementation. According to the convention, "layers" or "planes" (e.g., which can generally be used in an interchangeable manner) illustrated higher on the figure (i.e., closer to the top of the page) are implemented to be "on top" of layers illustrated lower on the figure (i.e., closer to the bottom of the page). Each level can exist independent of the levels above it, and each level is dependent on the levels below it. For example, the multimodal AI engine 225, the master data management plane 315, and the orchestration plane 320 can all be implemented substantially at a first level (a lowest layer, plane, etc.) of the CDNM system 300 architecture; and the data model plane 350 and the real-time inference plane 360 can be implemented at a second level that sits on top of the first level. As such, operation of the data model plane 350 and the real-time inference plane 360 is dependent on operation of some or all of the multimodal AI engine 225, the master data management plane 315, and the orchestration plane 320 (e.g., via the various abstraction layers).

Beginning at a first level of the illustrated CDNM system 300 architecture, the multimodal AI engine 225 can be implemented in the same manner described with reference to FIG. 2. For example, the multimodal AI engine 225 can use various AI methodologies to normalize heterogeneous raw real-time network data 217 from a raw data plane 215 into uniform golden record data. The normalization methodologies can vary, change, and adapt over time. Embodiments of the multimodal AI engine 225 can perform various tasks that include configuration and administration to bridge differences between metadata and schema of heterogeneous data sources from across the network. As described above, such normalization provides various features, such as facilitating automation of other functions and processes, speeding up total processing, etc. Embodiments of the master data management plane 315 can provide uniform data constructs that can then be utilized by other layers, planes, services, and applications within the CDNM system 300. As described with reference to FIG. 2, the master data management plane 315 can provide real-time golden record data 227 and historic golden record data 232. Embodiments of the orchestration plane 320 can facilitate configuring, administering, and coordinating of messaging between the DNAL 325 and data and actions of the higher layers, such as the real-time abstraction layer 340 and the real-time inference plane 360. This can be passed on to external API's, protocols, standard interfaces, etc. to carry out automated network management workflows 247. As illustrated, some implementations of the first level also include first-level applications 312 designed to operate at that level. For example, first-level applications 312 can be used to design automated network management workflows 247; and/or interfaces to functionality of the master data management plane 315, the orchestration plane 320, and/or the multimodal AI engine 225.

Moving to a next level of the illustrated CDNM system 300 architecture, the data model plane 350 can provide a non-real-time (e.g., training) leveraging path for golden record data, and the real-time inference plane 360 can provide a real-time leveraging path for the golden record data. Embodiments of the data model plane 350 can configure, administer, and deploy datasets created from the DNAL 325 that are then also combined with AI algorithms to self-train and run trained models on the datasets. For example, the data model plane 350 can include data model plane services 354 and data model plane applications 352. The data model plane applications 352 can be designed to define data models (e.g., in terms of desired types of data to populate the data models). The data model plane services 354 can interface between those data model plane applications 352 and other layers to populate the data models with historic golden record data 232, and to provide the populated models to higher levels (e.g., the AI application plane 390). Components of the data model plane 350 can obtain historic golden record data 232 by interacting with the master data management plane 315 via the DNAL 325 and the model abstraction layer 330. Embodiments can also include an intermediate data model plane interface 355 between the DNAL 325 and the model abstraction layer 330, such that the model abstraction layer 330 abstracts both the data model plane interface 355 and the DNAL 325 from the data model plane services 354 and data model plane applications 352.

Embodiments of the real-time inference plane 360 can configure, administer, and deploy datasets created from the DNAL 325 that are then also combined with already trained AI algorithms to run a trained model on the dataset to make predictions against previously unseen data. As described above, the previously unseen data is real-time golden record data 227 generated by the multimodal AI engine 225. The real-time inference plane 360 can include real-time abstraction plane services 364 and real-time abstraction plane applications 362. The real-time abstraction plane applications 362 can be designed to define automated network management workflows 247 (e.g., including defining related trigger conditions, types of relevant real-time input data, associated AI applications to obtain desired outputs, etc.). The real-time abstraction plane services 364 can interface between those real-time abstraction plane applications 362 and other layers to detect relevant trigger conditions and/or obtain relevant input information from the real-time golden record data 227, to provide relevant inputs to trained AI applications 392 in the AI application plane 390, to obtain results from the AI applications 392 in the AI application plane 390, and to pass those results down to the orchestration plane 320 for workflow execution. Components of the real-time inference plane 360 can obtain the real-time golden record data 227 by interacting with the lower levels of the architecture via the DNAL 325 and the real-time abstraction layer 340. Embodiments can also include an intermediate real-time abstraction interface 365 between the DNAL 325 and the real-time abstraction layer 340, such that the real-time abstraction layer 340 abstracts both the real-time abstraction interface 365 and the DNAL 325 from the real-time abstraction plane services 364 and real-time abstraction plane applications 362.

Moving to a highest level of the illustrated CDNM system 300 architecture, embodiments of the AI application plane 390 can provide various user and/or machine interfaces, AI applications 392, and AI services 394. The AI applications 255 of FIG. 2 can be implemented using the AI applications 392 and AI services 394 of FIG. 3. The AI applications 392 are designed, and then trained to generate particular outputs based on particular training inputs until very high correlation accuracy is achieved. The trained AI applications 392 can then generate highly correlated outputs from previously unseen inputs. Some of the AI services 392 contribute to the training of the AI applications 392, and others of the AI services 392 contribute to leveraging of the trained AI applications 392. For example, some of the AI services 392 interface with data model plane services 354 for training based on training models that are populated with historic golden record data 232; and others of the AI services 392 interface with real-time inference plane services 354 for generating outputs based on real-time golden record data 227.

The interfaces between the services of the various levels of the CDNM system 300 architecture can be handled by the service interface 370 and associated NNSAL 380, which can exist at a level of the CDNM system 300 architecture between the AI application plane 390 and the data model plane 350 and real-time inference plane 360. At that level, the service interface 370 and associated NNSAL 380 can provide any connected services and/or applications with access to services of the data model plane 350, the real-time inference plane 360, and the AI application plane 390. For example, the interfaces, AI applications 392, and AI services 394 of the AI application plane 390 can be connected to the NNSAL 380 to drive bi-directional and cross-plane uses of all sub-planes, abstraction layers, services, applications, etc.

While embodiments of the CDNM system are illustrated differently in FIGS. 2 and 3, each can be mapped onto the other. To that end, some implementations of the master data management subsystem 220 of FIG. 2 include components of the multimodal AI engine 225, the master data management plane 315, and the DNAL 325. Further, the illustrated CDNM system 210 in FIG. 2 is not intended to indicate any information regarding architectural levels (such as those indicated by the multi-level convention of FIG. 3), and a single subsystem of the CDNM system 210 may include components implemented in multiple layers of the architecture of FIG. 3. To that end, some embodiments of the AI subsystem 250 of FIG. 2 include components of the data model plane 350 and associated model abstraction layer 330, the AI application plane 390, and the service interface 370 and associated NNSAL 370. For example, the training engine 252 of FIG. 2 can be implemented by a combination of data model plane applications 352, data model plane services 354, AI applications 392, and AI services 394. Similarly, some implementations of the orchestrator subsystem 240 include components of the orchestration plane 320, the DNAL 325, and the real-time inference plane 360 and associated real-time abstraction layer 340.

Figure 4A:
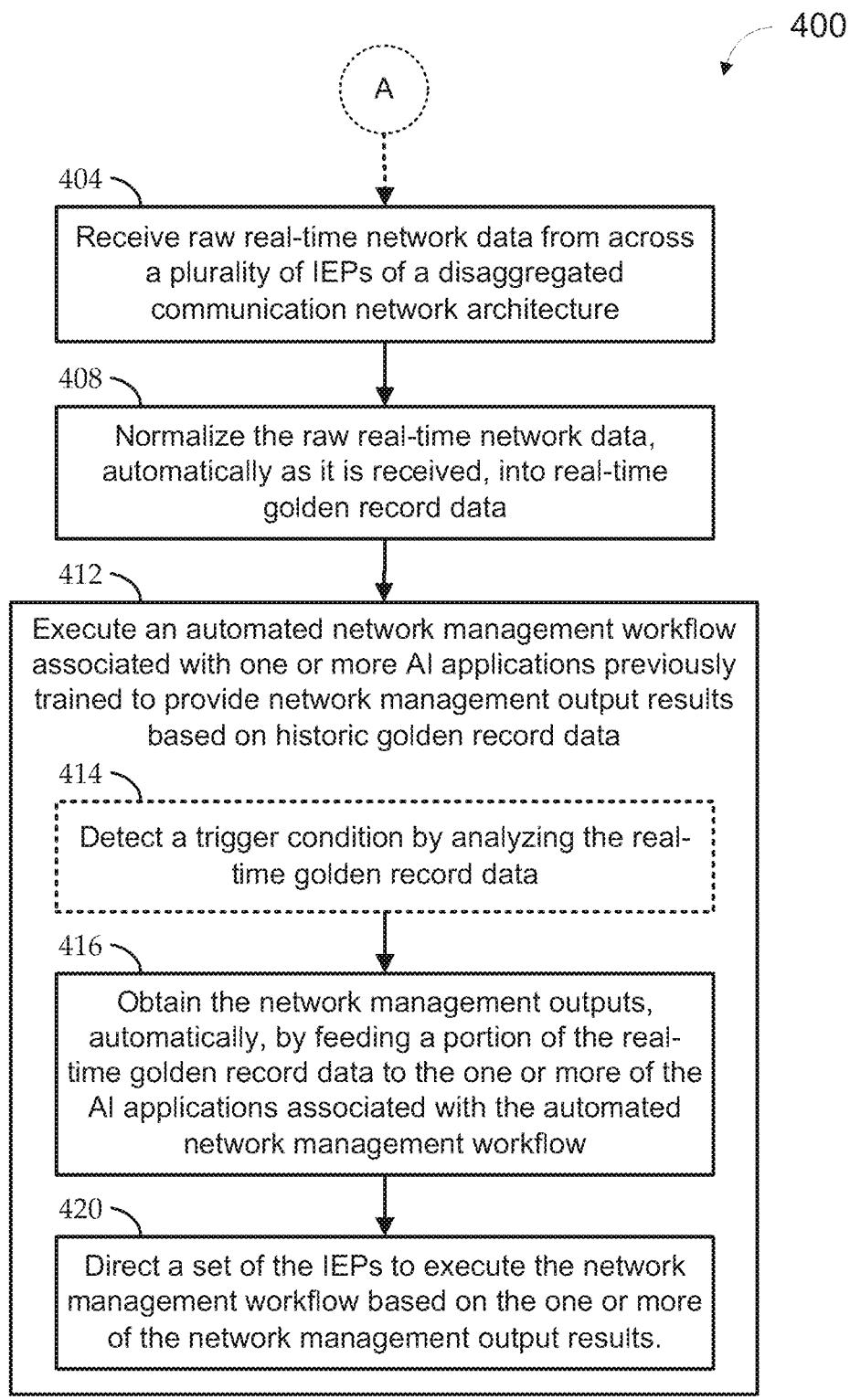
FIGS. 4A and 4B shows a flow diagram of an illustrative method for cognitive defined network management, according to various embodiments described herein.
Figure 4B:
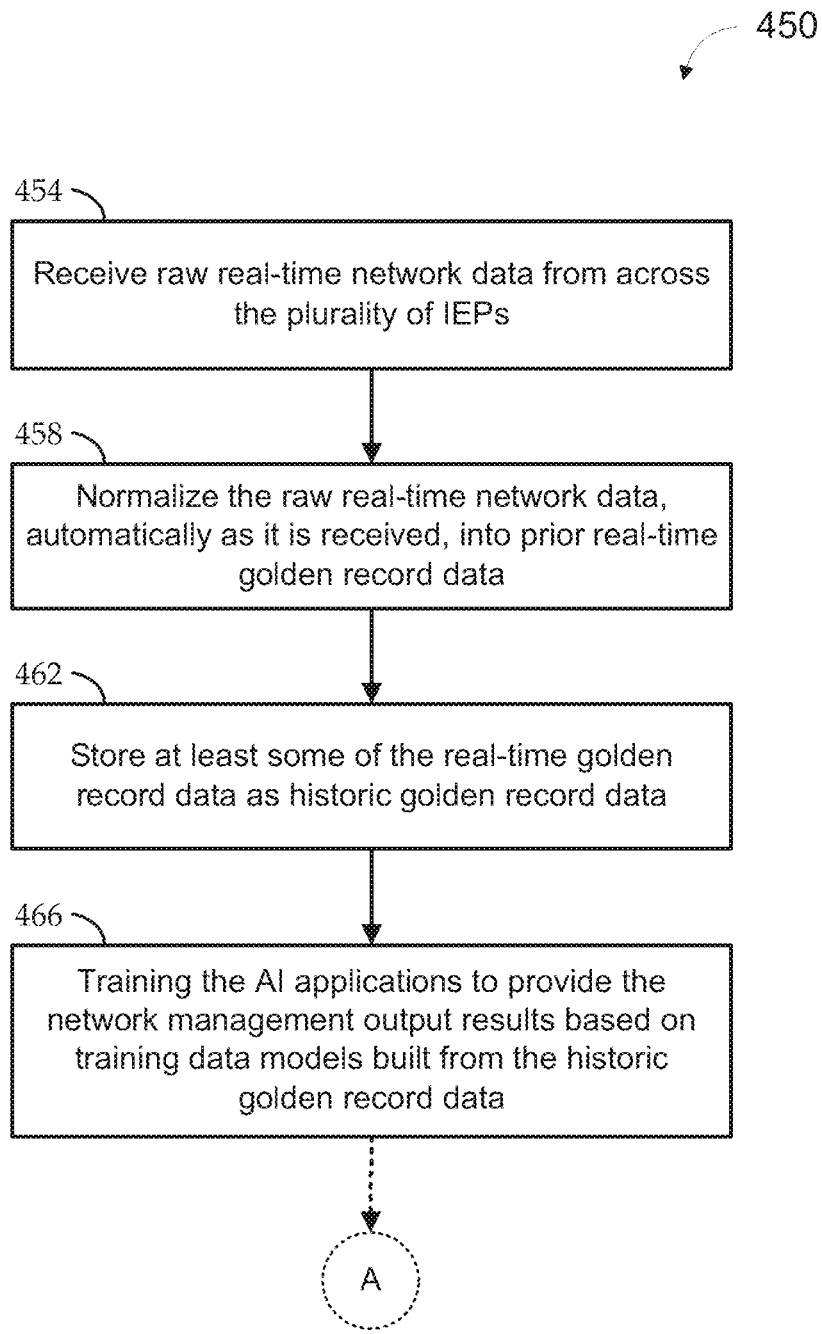

FIGS. 4A and 4B shows a flow diagram of an illustrative method 400 for cognitive defined network management, according to various embodiments described herein. Embodiments of the method 400 can be implemented using the systems described above in FIGS. 2 and 3. Embodiments of the method 400 can begin at stage 404 by receiving raw real-time network data from across multiple (e.g., hundreds, thousands, or more) ingress/egress points (IEPs) of a disaggregated communication network architecture. At stage 408, embodiments can normalize the raw real-time network data, automatically as it is received, into real-time golden record data. In some embodiments, the normalizing involves receiving the raw real-time network data as heterogeneous data from across the plurality of IEPs; and outputting the real-time golden record data as functionally correlated homogeneous data based on one or more previously trained AI algorithms.

At stage 412, embodiments can execute one or more automated network management workflows of a predefined multiple automated network management workflows. Executing the automated network management workflow at stage 412 can involve at least stages 416 and 420. At stage 416, embodiments can obtain one or more of the network management outputs, automatically, by feeding a portion of the real-time golden record data to one or more AI applications associated with the automated network management workflow. At stage 420, embodiments can direct a set of the IEPs to execute the network management workflow based on the one or more of the network management output results. For example, at least one of the automated network management workflows is configured to create or destroy a network slice, and the directing the set of IEPs at stage 420 includes directing the set of IEPs to create or destroy the network slice based on the one or more of the network management output results. In some embodiments, executing the automated network management workflow at stage 412 can further involve detecting a trigger condition, at stage 414, by analyzing the real-time golden record data automatically to detect a change in network condition matching a set of criteria defined by the automated network management workflow. In such embodiments, the executing (e.g., performance of stages 416 and 420) is performed automatically in response to the detecting the trigger condition.

As described herein, each automated network management workflow is associated with one or more of multiple AI applications previously trained to provide network management output results based on historic golden record data. For example, as shown in FIG. 4B, some embodiments of the method 400 can include a sub-method 450 for training the AI applications according to stages 454-466. At stage 454, embodiments can receive raw real-time network data from across the plurality of IEPs. At stage 458, embodiments can normalize the raw real-time network data, automatically as it is received, into first real-time golden record data. Stages 454 and 458 can be identical to stages 404 and 408, except that stages 454 and 458 are assumed to have occurred one or more times (e.g., potentially a very large number of times) prior to performance of stage 404. At stage 462, embodiments can store at least some of the real-time golden record data as the historic golden record data. At stage 468, embodiments can train the AI applications to provide the network management output results based on training data models built from the historic golden record data.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cognitive defined network management (CDNM) system comprising:
    a master data management subsystem comprising:
        a raw data plane interface to receive raw real-time network data from across a plurality of ingress/egress points (IEPs) of a disaggregated communication network architecture; and
        a multimodal artificial intelligence (AI) engine trained to normalize the raw real-time network data, as it is received, into real-time golden record data;
    an AI application subsystem coupled with the master data management subsystem and having a plurality of AI applications trained to provide network management output results based on training data models built from previously received datasets of real-time golden record data; and
    an orchestration subsystem, coupled with the master data management subsystem and the AI application subsystem, and configured, for each of a predefined plurality of automated network management workflows, to:
        automatically obtain one or more of the network management output results by feeding a portion of the real-time golden record data to a set of the AI applications that is associated with the automated network management workflow; and
        direct a set of IEPs to execute the network management workflow based on the one or more of the network management output results.

2. The CDNM system of claim 1, wherein:
    the master data management subsystem further comprises a database to store at least some of the real-time golden record data as historic golden record data; and
    the plurality of AI applications is trained to provide the network management output results based on training data models built from the historic golden record data.

3. The CDNM system of claim 1, wherein the multimodal AI engine is trained to normalize the raw real-time network data into real-time golden record data by receiving the raw real-time network data as heterogeneous data from across the plurality of IEPs, and outputting the real-time golden record data as functionally correlated homogeneous data based on one or more previously trained AI algorithms.

4. The CDNM system of claim 1, wherein:
    the orchestration subsystem is further configured, for at least one of the predefined plurality of automated network management workflows, to:
        detect a trigger condition by analyzing the real-time golden record data automatically to detect a change in network condition matching a set of criteria defined by the automated network management workflow,
    wherein the automatically obtaining the one or more of the network management output results and the directing the set of IEPs to execute the network management workflow are performed automatically in response to the detecting the trigger condition.

5. The CDNM system of claim 1, further comprising:
    a first level of a multi-level architecture, the first level having the multimodal AI engine, a master data management plane, and an orchestration plane;
    a second level having a data model plane and a real-time inference plane; and
    a third level having an AI application plane,
    wherein the second level is higher than the first level and lower than the third level, such that operation of the second level is dependent on operation of the first level, and operation of the third level is dependent on operation of the second level.

6. The CDNM system of claim 5, wherein the master data management subsystem is implemented by components of the multimodal AI engine and the master data management plane in the first level.

7. The CDNM system of claim 5, wherein the orchestrator subsystem is implemented by components of the orchestration plane in the first level and by components of the real-time inference plane in the second level.

8. The CDNM system of claim 5, wherein the AI subsystem is implemented by components of the data model plane 330 in the second level and by components of the AI application plane in the third level.

9. The CDNM system of claim 5, wherein the first level further has a data normalization abstraction layer to abstract the master data management plane and the orchestration plane from higher levels.

10. The CDNM system of claim 5, wherein the second level further has a model abstraction layer below the data model plane to abstract services and applications of the data model plane from the first level.

11. The CDNM system of claim 5, wherein the second level further has a real-time abstraction layer below the real-time inference plane to abstract services and applications of the real-time inference plane from the first level.

12. The CDNM system of claim 5, further comprising:
    a fourth level of the multi-level architecture having a service interface between services of the AI application plane, the data model plane, and the real-time inference plane,
    wherein the fourth level is higher than the second level and lower than the third level, such that operation of the fourth level is dependent on operation of the second level, and operation of the third level is further dependent on operation of the fourth level.

13. The CDNM system of claim 11, wherein the fourth level further has a neural network service abstraction layer above the service interface to abstract the service interface from the AI application plane.

14. The CDNM system of claim 1, wherein:
    at least one of the plurality of automated network management workflows is configured to create or destroy a network slice; and
    the directing the set of IEPs comprises directing the set of IEPs to create or destroy the network slice based on the one or more of the network management output results.

15. The CDNM system of claim 1, wherein the disaggregated communication network architecture is a fifth generation (5G) wireless communication network.

16. A method for cognitive defined network management, the method comprising:
    receiving raw real-time network data from across a plurality of ingress/egress points (IEPs) of a disaggregated communication network architecture;

normalizing the raw real-time network data, automatically as it is received, into real-time golden record data; and executing an automated network management workflow of a predefined plurality of automated network management workflows, the automated network management workflow associated with one or more of a plurality of artificial intelligence (AI) applications previously trained to provide network management output results based on historic golden record data, the executing comprising:

obtaining one or more of the network management outputs, automatically, by feeding a portion of the real-time golden record data to the one or more of the plurality of AI applications that is associated with the automated network management workflow; and directing a set of the IEPs to execute the network management workflow based on the one or more of the network management output results.

17. The method of claim 16, wherein the raw real-time network data is second raw real-time network data received at a second time, and the real-time golden record data is second real-time golden record data, and further comprising, at a first time prior to the second time:

receiving first raw real-time network data from across the plurality of IEPs;

normalizing the first raw real-time network data, automatically as it is received, into first real-time golden record data;

storing at least some of the first real-time golden record data as the historic golden record data; and training the plurality of AI applications to provide the network management output results based on training data models built from the historic golden record data.

18. The method of claim 16, wherein the normalizing comprises:

receiving the raw real-time network data as heterogeneous data from across the plurality of IEPs; and outputting the real-time golden record data as functionally correlated homogeneous data based on one or more previously trained AI algorithms.

19. The method of claim 16, further comprising:

detecting a trigger condition by analyzing the real-time golden record data automatically to detect a change in network condition matching a set of criteria defined by the automated network management workflow, wherein the executing is automatically in response to the detecting the trigger condition.

20. The method of claim 16, wherein:

at least one of the plurality of automated network management workflows is configured to create or destroy a network slice; and the directing the set of IEPs comprises directing the set of IEPs to create or destroy the network slice based on the one or more of the network management output results.

* * * * *

UNITED STATES PATENT AND TRADEMARK OFFICE
CERTIFICATE OF CORRECTION

PATENT NO. : 11,568,345 B1
APPLICATION NO. : 17/407602
DATED : January 31, 2023
INVENTOR(S) : Justin Wayne Caswell It is certified that error appears in the above-identified patent and that said Letters Patent is hereby corrected as shown below:

In the Claims

In Claim 8, Column 16, Line 25, please delete "330"

Signed and Sealed this
Thirtieth Day of May, 2023

Katherine Kelly Vidal
*Director of the United States Patent and Trademark Office*